(12) United States Patent
Prabhakaran

(10) Patent No.: US 6,889,139 B2
(45) Date of Patent: May 3, 2005

(54) SYSTEM AND METHOD FOR MOBILE DATA PROCESSING AND TRANSMISSION

(75) Inventor: Sanjiv Prabhakaran, San Jose, CA (US)

(73) Assignee: Sidewinder Holdings Ltd., Coppell, TX (US)

(*) Notice: Subject to any disclaimer, the term of this patent is extended or adjusted under 35 U.S.C. 154(b) by 117 days.

(21) Appl. No.: 10/001,071

(22) Filed: Oct. 24, 2001

(65) Prior Publication Data

US 2003/0046451 A1 Mar. 6, 2003

Related U.S. Application Data

(60) Provisional application No. 60/040,160, filed on Mar. 7, 1997.

(51) Int. Cl.$^7$ .............................................. G08B 23/00
(52) U.S. Cl. ........................ 701/213; 701/24; 701/33; 342/463; 340/988; 455/557
(58) Field of Search ................................. 701/213, 115, 701/102, 33, 24, 1; 342/463; 370/468, 473; 340/426.21, 539.13, 988, 5.61, 426.2; 455/557

(56) References Cited

U.S. PATENT DOCUMENTS

| | | |
|---|---|---|
| 3,742,359 A | 6/1973 | Behymer |
| 3,845,289 A | 10/1974 | French |
| 4,031,468 A | 6/1977 | Ziebell et al. |
| 4,257,415 A | 3/1981 | Rubin |
| 4,360,876 A | 11/1982 | Girault et al. |
| 4,510,565 A | 4/1985 | Dummermuth |
| 4,513,377 A | 4/1985 | Hasebe et al. |
| 4,570,227 A | 2/1986 | Tachi et al. |
| 4,608,656 A | 8/1986 | Tanaka et al. |
| 4,611,293 A | 9/1986 | Hatch et al. |
| 4,613,913 A | 9/1986 | Phillips |
| 4,630,209 A | 12/1986 | Saito et al. |
| 4,635,110 A | 1/1987 | Weinblatt |
| 4,660,037 A | 4/1987 | Nakamura |
| 4,672,565 A | 6/1987 | Kuno et al. |
| 4,673,878 A | 6/1987 | Tsushima et al. |
| 4,675,676 A | 6/1987 | Takanabe et al. |
| 4,677,654 A | 6/1987 | Lagin et al. |
| 4,697,281 A | * 9/1987 | O'Sullivan .................. 455/557 |
| 4,723,218 A | 2/1988 | Hasebe et al. |

(Continued)

OTHER PUBLICATIONS

Allen "Here Be Dragons . . . " *CD-ROM EndUser*, Mar. 1990(1990).

"Colorado Company Develops User-Friendly Mobil Internet System; Fleet Management, Emergency Service are Potential Applications," Wireless Data News, Mar. 6, 1998 (1998).

French "Map Matching Origins Approaches and Applications," Proc. Second International Symposium on Land Vehicle Navigation, Jul., 1989, pp. 91–116 (1989).

(Continued)

*Primary Examiner*—Thomas G. Black
*Assistant Examiner*—Arthur D. Donnelly
(74) *Attorney, Agent, or Firm*—Townsend and Townsend and Crew LLP

(57) ABSTRACT

According to the present invention, a technique for processing data is provided. The invention provides a flexible way to process data such that a user may conveniently enter and transfer data. Also, the user may have ready access to powerful data processing. In an embodiment of the present invention, a novel system (110) for mobile data processing is provided. The system includes an interface unit (116) that includes a processor (122). A positioning system (120) couples to a first antenna (126) and to the processor. A remote data terminal (118) electrically couples to the interface unit during at least a first time period. The remote data terminal is capable of data transfers with the interface unit during the first time period and with a user.

28 Claims, 7 Drawing Sheets

U.S. PATENT DOCUMENTS

| | | |
|---|---|---|
| 4,734,863 A | 3/1988 | Honey et al. |
| 4,737,916 A | 4/1988 | Ogawa et al. |
| 4,751,512 A | 6/1988 | Longaker |
| 4,782,447 A | 11/1988 | Ueno et al. |
| 4,788,645 A | 11/1988 | Zavoli et al. |
| 4,796,191 A | 1/1989 | Honey et al. |
| 4,797,841 A | 1/1989 | Hatch |
| 4,831,563 A | 5/1989 | Ando et al. |
| 4,862,398 A | 8/1989 | Shimizu et al. |
| 4,873,513 A | 10/1989 | Soults et al. |
| 4,881,258 A | 11/1989 | Kaiwa et al. |
| 4,891,650 A | 1/1990 | Sheffer |
| 4,914,605 A | 4/1990 | Loughmiller, Jr. et al. |
| 4,918,609 A | 4/1990 | Yamawaki |
| 4,924,402 A | 5/1990 | Ando et al. |
| 4,926,336 A | 5/1990 | Yamada |
| 4,937,753 A | 6/1990 | Yamada |
| 4,954,959 A | 9/1990 | Moroto et al. |
| 4,964,052 A | 10/1990 | Ohe |
| 4,970,652 A | 11/1990 | Nagashima |
| 4,982,332 A | 1/1991 | Saito et al. |
| 4,984,168 A | 1/1991 | Neukrichner et al. |
| 4,989,151 A | 1/1991 | Nuimura |
| 4,992,947 A | 2/1991 | Nimura et al. |
| 4,996,645 A | 2/1991 | Schneyderberg Van Der Zon |
| 4,999,783 A | 3/1991 | Tenmoku et al. |
| 5,003,317 A | 3/1991 | Gray et al. |
| 5,031,807 A | 7/1991 | Tiffany |
| 5,040,122 A | 8/1991 | Neukirchner et al. |
| 5,046,011 A | 9/1991 | Kakihara et al. |
| 5,060,162 A | 10/1991 | Ueyama et al. |
| 5,067,081 A | 11/1991 | Person |
| 5,109,399 A | 4/1992 | Thompson |
| 5,122,959 A | 6/1992 | Nathanson et al. |
| 5,140,532 A | 8/1992 | Beckwith, Jr. et al. |
| 5,155,689 A | 10/1992 | Wortham |
| 5,177,665 A | 1/1993 | Frank et al. |
| 5,177,685 A | 1/1993 | Davis et al. |
| 5,186,375 A | 2/1993 | Plonk |
| 5,214,574 A | 5/1993 | Chang |
| 5,222,690 A | 6/1993 | Jeffords |
| 5,226,540 A | 7/1993 | Bradbury |
| 5,243,530 A | 9/1993 | Stanifer et al. |
| 5,272,638 A | 12/1993 | Martin et al. |
| 5,283,743 A | 2/1994 | Odagawa |
| 5,285,559 A | 2/1994 | Thompson et al. |
| 5,287,297 A | 2/1994 | Ihara et al. |
| 5,297,049 A | 3/1994 | Gurmu et al. |
| 5,297,050 A | 3/1994 | Ichimura et al. |
| 5,311,195 A | 5/1994 | Mathis et al. |
| 5,334,974 A | 8/1994 | Simms et al. |
| 5,367,296 A | 11/1994 | Schell |
| 5,408,695 A | 4/1995 | Dorr |
| 5,428,546 A | 6/1995 | Shah et al. |
| 5,434,788 A | 7/1995 | Seymour et al. |
| 5,442,512 A | 8/1995 | Bradbury |
| 5,457,629 A | 10/1995 | Miller et al. |
| 5,458,123 A | 10/1995 | Unger |
| 5,470,233 A | 11/1995 | Fruchterman et al. |
| 5,485,161 A | 1/1996 | Vaughn |
| 5,487,139 A | 1/1996 | Saylor et al. |
| 5,528,453 A | 6/1996 | Berman et al. |
| 5,594,650 A | 1/1997 | Shah et al. |
| 5,604,676 A | 2/1997 | Penzias |
| 5,624,035 A | 4/1997 | Kim |
| 5,631,947 A | 5/1997 | Wittstein et al. |
| 5,636,122 A | 6/1997 | Shah et al. |
| 5,638,374 A | 6/1997 | Heath |
| 5,659,761 A | 8/1997 | DeArras et al. |
| 5,667,272 A | 9/1997 | Sutton |
| 5,671,436 A | 9/1997 | Morris et al. |
| 5,677,837 A | 10/1997 | Reynolds |
| 5,712,899 A | 1/1998 | Pace, II |
| 5,719,771 A | 2/1998 | Buck et al. |
| 5,729,457 A | 3/1998 | Seymour |
| 5,758,313 A | 5/1998 | Shah et al. |
| 5,794,164 A | 8/1998 | Beckert et al. |
| 5,819,942 A | 10/1998 | Sadow |
| 5,848,373 A | 12/1998 | DeLorme et al. |
| 5,854,787 A * | 12/1998 | Dodge et al. ............... 370/349 |
| 5,859,628 A | 1/1999 | Ross et al. |
| 5,884,216 A | 3/1999 | Shah et al. |
| 5,904,727 A | 5/1999 | Prabhakaran |
| 5,922,040 A | 7/1999 | Prabhakaran |
| 5,938,721 A | 8/1999 | Dussell et al. |
| 6,087,952 A * | 7/2000 | Prabhakaran ............ 340/693.5 |
| 6,122,527 A * | 9/2000 | Robinson et al. ........... 455/557 |
| 6,262,656 B1 * | 7/2001 | Byrd et al. ............ 340/426.21 |

OTHER PUBLICATIONS

Marshall "Hi–Tech Fleet Management," Fleet Equipment 11:27–30 (1996).

Marshall "A Way to Track 911 Calls Made from Cell Phones," *San Francisco Chronicle*, Thursday, Apr. 9, 1998 (1998).

Mclellan et al., "The NavTrax Fleet Management System," Position Location and Navigation Symposium; IEEE, Mar. 23–27, 1992, pp. 509–515 (1992).

SENA "Computer–Aided Dispatching," Computer Graphics World 13:34 (1990).

* cited by examiner

MOBILE INFORMATION
SYSTEM, INC.

Press [ACK]

to

Activate System

*FIG. 4*

— WARNING ! —

DO NOT OPERATE
THE TERMINAL
WHILE DRIVING

*FIG. 5*

WELCOME
TO
MOBILE INFORMATION
SYSTEMS, INC.

*FIG. 6*

SYSTEM AND METHOD FOR MOBILE DATA PROCESSING AND TRANSMISSION

CROSS REFERENCE TO RELATED APPLICATIONS

This application is a nonprovisional application of, and claims priority from, commonly assigned U.S. provisional application Ser. No. 60/040,160, filed on Mar. 7, 1997, incorporated herein by reference. This application is also related to application Ser. Nos. 09/036,555 and 09/036,097 filed on the same date of this present application, all in the name to the present assignee. All these documents are hereby incorporated by reference for all purposes.

COPYRIGHT NOTICE

A portion of the disclosure of this patent contains material which is subject to copyright protection. The copyright owner has no objection to the facsimile reproduction by anyone of the patent document or the patent disclosure as it appears in the Patent and Trademark Office patent file or records, but otherwise reserves all Copyright rights whatsoever.

BACKGROUND OF THE INVENTION

The present invention relates to an apparatus and system for data processing and, more specifically, data processing as it relates to transportation management. The present invention is illustrated by way of an example with regard to an apparatus and method capable of remotely transmitting and receiving information, especially information relevant to fleet management such as delivery locations and times. But it will be recognized that the invention has a wider range of applicability. Merely by way of example, the invention can be applied to other types of transportation, mapping, information management, and the like.

As the world becomes more industrialized and populated, transportation requirements also increase rapidly. In particular, the number of vehicles such as automobiles, trucks, vans, and the like on typical city highways has increased to levels such that traffic jams are now a way of life for a typical driver using these highways as a means for travel. In fact, some of these highways are so constricted that anyone using them can experience significant delays often unexpectedly due to problems such as accidents, road construction, and others. These problems also exist on other transportation ways such as our city streets, airways, and waterways. Accordingly, it is often difficult to predict with any accuracy the location of a vehicle using these transportation ways.

Cities and governments have attempted to resolve some of these problems by adding more transportation infrastructure in highly populated areas. This infrastructure often comes in the form of improved roads or highways, train systems, and the like. Unfortunately, roads, highways, and train systems are often difficult to build in highly populated areas and are generally extremely expensive and time consuming to build. In most cases, construction used to provide this additional infrastructure often causes even more traffic congestion and other problems.

Based upon this state of the transportation infrastructure in most industrialized countries, it is often difficult for a company involved in the courier or delivery business to accurately track its vehicles and deliveries. The problems mentioned above severely limit the predictability for a fleet manager to track vehicles in its fleet for the pick-up and delivery of information, packages, and people. Moreover, it is desirable but difficult to keep the fleet manager up-to-date about the status of members of the fleet and to update the fleet members with information from the manager.

Industry also has attempted to resolve some of these problems. For instance, some companies are now providing their couriers with cellular phones and radios so that a dispatcher can communicate with them. Other companies retrofit their vehicles with navigational systems such as LORAN or a global positioning system (GPS) to determine vehicle location. Still, other companies are using maps and GPS to track vehicle location by dispatchers at a central office terminal.

One such company is Mobile Information Systems, Inc. ("Mobile Information Systems"), assignee of the present application, which pioneered a technique for implementing easy-to-read maps for tracking vehicle location on a display or workstation at the central office terminal or any other terminal. In particular, Mobile Information Systems implemented one of the first techniques for using a raster-type map and vector data for referencing vehicle location. The raster-type map used on a display had features that were easy-to-read for a dispatcher or user. These features were generally geographical in nature and were easier to reference than the maps predominantly made using stick-type representations of geographical features. The techniques used by Mobile Information Systems have partly overcome some of the daily problems faced by a fleet manager or the like. It would, however, be desirable to develop other techniques for integrating further aspects of fleet management.

Based upon the above, it would be desirable to develop a device for improving a user's ability to create and receive data to help with the predictability, efficiency, and accuracy of task management such as fleet management or tracking any object that can be transported into our roadways, highways, waterways, airways, and the like.

SUMMARY OF THE INVENTION

According to the present invention, a technique for processing data is provided. In an exemplary embodiment, the invention provides a flexible way to process data at a remote location such that a user may conveniently enter and transfer data and also have ready access to powerful data processing. The present technique can be used in a variety of applications such as transportation and the like.

In an embodiment of the present invention a novel system for mobile data processing is provided. The system includes an interface unit (e.g., hand-held unit, mobile data terminal, personal information manager, commonly known as PIM or the like) that includes a processor, e.g., microprocessor, digital signal processor, microcomputer. A positioning system couples to a first antenna and to the processor. A remote data terminal electrically couples to the interface unit during at least a first time period. The remote data terminal is capable of data transfers with the interface unit during the first time period and with a user. This system allows a user to take the remote data terminal on errands away from the interface unit, and transfer data to and from the interface unit.

In another embodiment, the remote data terminal is adapted to be hand-held. This allows the user to carry the remote data terminal on errands. Thus, the user can enter data conveniently in real-time when the user receives data. This, for example, allows the user to avoid writing the data onto paper only to be entered electronically later.

In still another embodiment, the present invention provides a method of data processing including receiving user data in a control unit, receiving positioning data from a first antenna of the control unit, and transmitting the user data and the positioning data, using a second antenna of the control unit, to a base station. This embodiment provides a method by which user data may be combined with positioning data thereby providing an indication of not only the substance but also the origin of the user data.

In yet an alternative embodiment, the present invention provides a microprocessor based system using a novel set of instructions or computer codes. The computer codes form a computer program to carry out the functionality and methods described herein. The functionality and methods are described throughout the present specification and more particularly below.

This invention provides myriad advantages. For example, quick access could be gained to valuable information such as the user's current location, speed, direction, destination, schedule, estimated time to destination, and required time to destination in some embodiments. The present invention can also store and transmit precise tracking information regarding the user's past, present, and future positions and locations at noteworthy times such as when the user reaches certain destinations including pickup and delivery points in other embodiments. When used in conjunction with scheduling techniques, the present invention can, for example, improve user efficiency by reducing the time and cost of travel between destinations while providing improved tracking of the user, packages, or the like. The present invention can provide accurate location and tracking information automatically, without requiring the user to enter this information which may require additional time or introduce human error. Also, the present invention may provide these and other advantages in a convenient and portable package. Of course, the present invention provides other advantages. Hence, the description provided here is only exemplary and not an exhaustive list.

Some of the novel features of the invention are set forth in the appended claims. The invention, however, as well as other features and advantages thereof, will be best understood by reference to the detailed description which follows, when read in conjunction with the accompanying drawings.

BRIEF DESCRIPTION OF THE DRAWINGS

FIG. 4 illustrates a simplified sample startup activation screen on a display of the mobile data terminal according to an aspect of the present invention;

FIG. 5 shows a simplified sample warning screen on the mobile data terminal display in yet another aspect of the present invention;

FIG. 6 shows a simplified sample welcome screen on the mobile data terminal display according to an aspect of the present invention;

DETAILED DESCRIPTION OF SPECIFIC EMBODIMENTS

The following descriptions use several acronyms and abbreviations. For the reader's convenience, the following is a list of the more frequently used acronyms and abbreviations:

| | |
|---|---|
| GPS | Global Positioning System |
| MCU | Mobile Control Unit |
| MDS | Mobile Data Suite |
| MDT | Mobile Data Terminal |
| MIC | Mobile Information Center |
| T/R | Transmitter/Receiver |

Hardware Description

Figure 1:
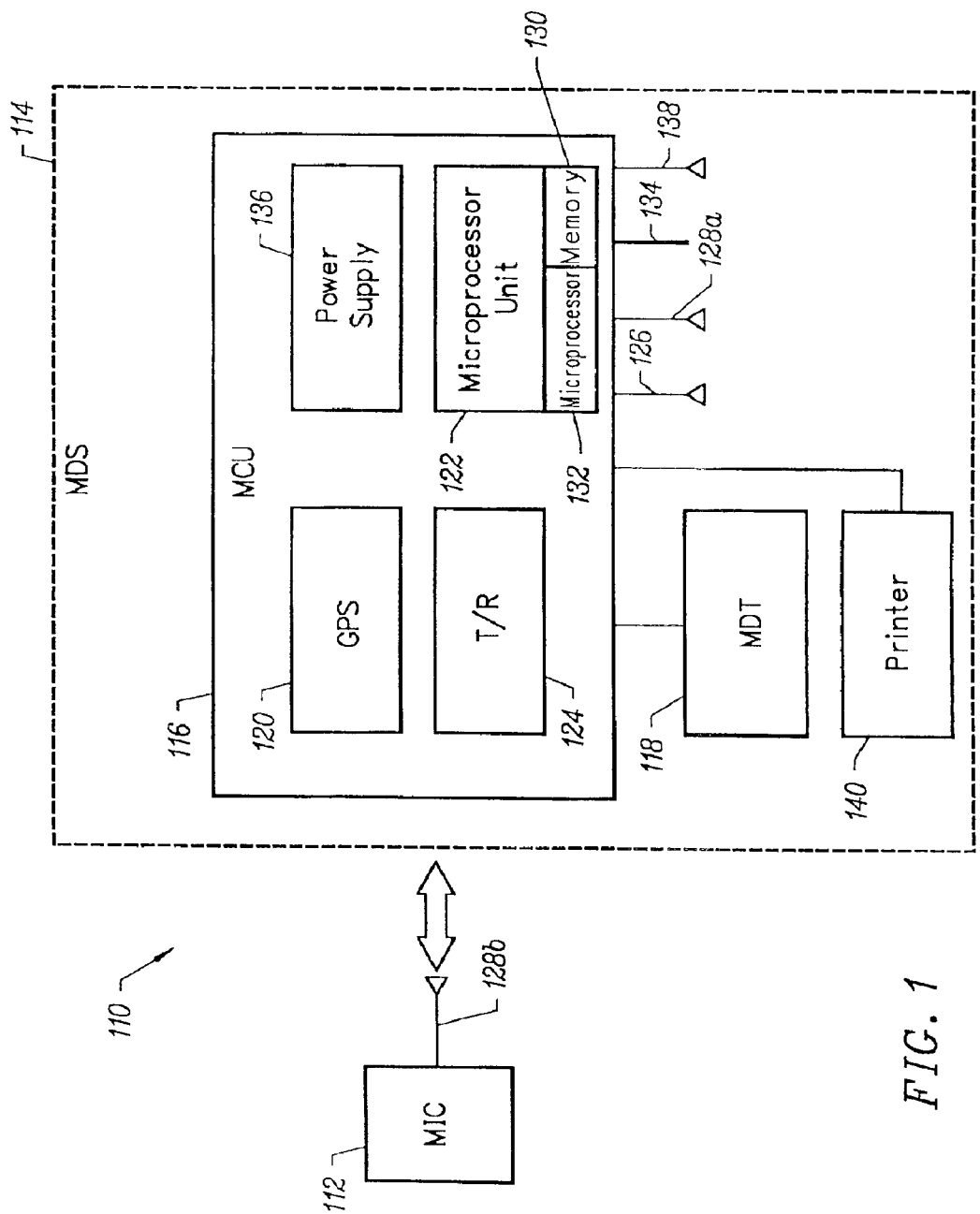
FIG. 1 is a simplified block diagram of a data processing system according to an embodiment of the present invention.

FIG. 1 shows a simplified overall system 110 in an information management system, such as a fleet management system, according to an embodiment of the present invention. This diagram is merely an illustration and should not limit the scope of the claims herein. One of ordinary skill in the art would recognize other variations, alternatives, and modifications. System 110 includes a mobile information center (MIC), or base station, 112 that interacts with a mobile data suite (MDS) 114. The MIC may include a system, such as a software system, to manage several MDS users to efficiently control fleet use. As merely an example, U.S. Ser. No. 08/706,211, commonly assigned, describes a MIC according to the present invention. This application is incorporated by reference herein for all purposes. Of course, other types of systems which have similar functionality as the MIC described herein can also be used.

As shown, the MDS is an integrated module including a mobile control unit (MCU) 116 and a mobile data terminal (MDT) 118. In an embodiment, the MDS is an on-board module, adapted to fit conveniently in a fleet vehicle such as a car, van, or truck. Preferably, the MDS is easily portable, fitting in a carrying case no bigger than approximately 18"×12"×10" and weighing approximately 10 pounds or less. This portability allows a user to remove the MDS from the vehicle for safe storage or for convenient maintenance away from the confines of the vehicle. In an embodiment, the MDT may act as an interface between the MCU and the user for receiving and displaying information.

Preferably, the MCU includes a global positioning system (GPS) 120, a microprocessor unit 122 (e.g., a microprocessor board, a microcomputer, a micro-controller, a programmable controller), and a transmitter/receiver (T/R) unit 124. The GPS allows monitoring of positioning-related information, e.g., latitude and longitude. Positioning data enters the GPS via a GPS antenna 126. The GPS antenna may be mounted on the exterior of the vehicle, but is not limited to this location. This may improve reception of the antenna while reducing space consumed by the system inside the vehicle. A magnetic base may be used to mount the antenna that will allow a user to quickly and easily remove the antenna for storage, to improve reception, or for other purposes. From the positioning data, the GPS can determine the current or past location of the MCU based on information received from global positioning satellites. The GPS, the microprocessor unit, or the MDT (including MDT software) either alone or in combination, may use the information received by the GPS to determine information related to system management such as the vehicle's speed and heading. Alternatively, equipment at the MIC or elsewhere in the MCU, such as in the microprocessor unit, may determine this system management information. In an embodiment, the GPS is a Trimble OEM GPS receiver card made by Trimble Navigation, although other GPS systems can be used.

Any form of positioning system capable of determining the location of the MCU could replace the GPS. For example, a system using information from local position detectors instead of global positioning satellites could be used.

The GPS is generally not required and may be omitted from the MCU. In particular, not using a GPS may reduce the size, weight, complexity, initial cost, and maintenance expense of the MCU. Eliminating the GPS may be desirable for applications when system size and weight are at a premium such as for a bicycle messenger.

In an embodiment, the MCU T/R receives data from, and transfers data to, the MIC via an MCU T/R antenna 128a. The MIC receives data from, and transmits data to, the MCU via a MIC antenna 128b (the data transfer represented by a double-ended arrow). Data from the microprocessor or GPS may be sent to the MIC or data from the MIC may be received and transferred to the GPS or microprocessor as needed by the MCU T/R. The MCU T/R may process received data as necessary to be in a form compatible with its destination. The MCU T/R is preferably a radio T/R, such as a radio frequency radio modem, due to cost and maintenance advantages. For example, the MCU T/R may be a RAM compatible Mobitek Modem made by Mobitek. Other forms of T/R units, however, may be used depending upon the application. The MCU T/R antenna, similar to the GPS antenna, may have a magnetic base, or be otherwise adapted, to assist mounting the antenna on the exterior of the fleet vehicle. To reduce interference, the GPS antenna and the MCU T/R antenna may be mounted at least about 12 inches apart.

In an embodiment, the microprocessor unit may act as an interface unit in the MDS. For example, the microprocessor may provide an interface between the MCU T/R and the MDT, the MCU T/R and the GPS, or the GPS and the MDT. Included in the microprocessor unit are a memory 130 and a microprocessor 132. The memory may, for example, store messages for the user of the MDS. These messages may come from, for example, the MIC, the GPS, or the user. Messages may be categorized into groups for convenience such as received but not yet read, received and previously read, and sent. The microprocessor can access desired portions of the memory for data insertion or retrieval. The microprocessor may also process data from the memory, the MIC, the GPS, or the MDT before transferring the data to the memory, the MIC, the GPS, or the MDT. Examples of such processing may include determining speed and heading information based upon positioning data.

In an embodiment of the present invention, the MDS architecture includes the MDT, MCU, GPS, microprocessor unit, and MCU T/R. The microprocessor unit may act as the central controller of the MDS, directing information flow between the components and storing information as necessary. The GPS receives information through its antenna and the microprocessor unit may store this data and/or direct it to the MCU T/R for transmission to the MIC or to the MDT for user viewing. Information from the MDT may also pass to the MCU T/R and/or be stored in memory under the direction of the microprocessor unit. The MCU T/R may then transmit the data to the MIC. The MCU T/R may also receive information from the MIC which the microprocessor unit may then direct into memory and/or to the MDT.

A power cable 134 may connect the MCU to an external power supply. The external power supply may be the same power supply used by the vehicle. For example, the power cable may have a connector (not shown) that fits into a cigarette lighter socket of the vehicle. The MCU would then use the electrical energy from the vehicle such as a 12-volt battery. Using an external power supply could help reduce the size, weight, and cost of the MDS.

Alternatively, the MCU may have an internal power supply 136 in addition to, or in lieu of, the external power supply. Having an internal power supply would allow the MDS to operate independently of an external power supply. The user could, for example, use the MDS in places which would be inaccessible if the MCU was dependent upon a vehicle power supply. Also, having an internal power supply would allow the user to use the MDS as needed in case of a failure of the vehicle's power supply. For example, the user could relay information to the MIC if the user is in an accident that causes the battery to stop functioning, or during a malfunction which prevents energy from reaching the power cable.

The MDS may also include a printer 140. Having a printer would, for example, allow the user to make a hard copy of data received from the MIC, transmitted to the MIC, or entered into the MDT even if not transmitted to the MIC. The printer may also be utilized to provide a hard copy of other information such as the configuration of the MDS, GPS, MDT, or the MCU.

Figure 2A:
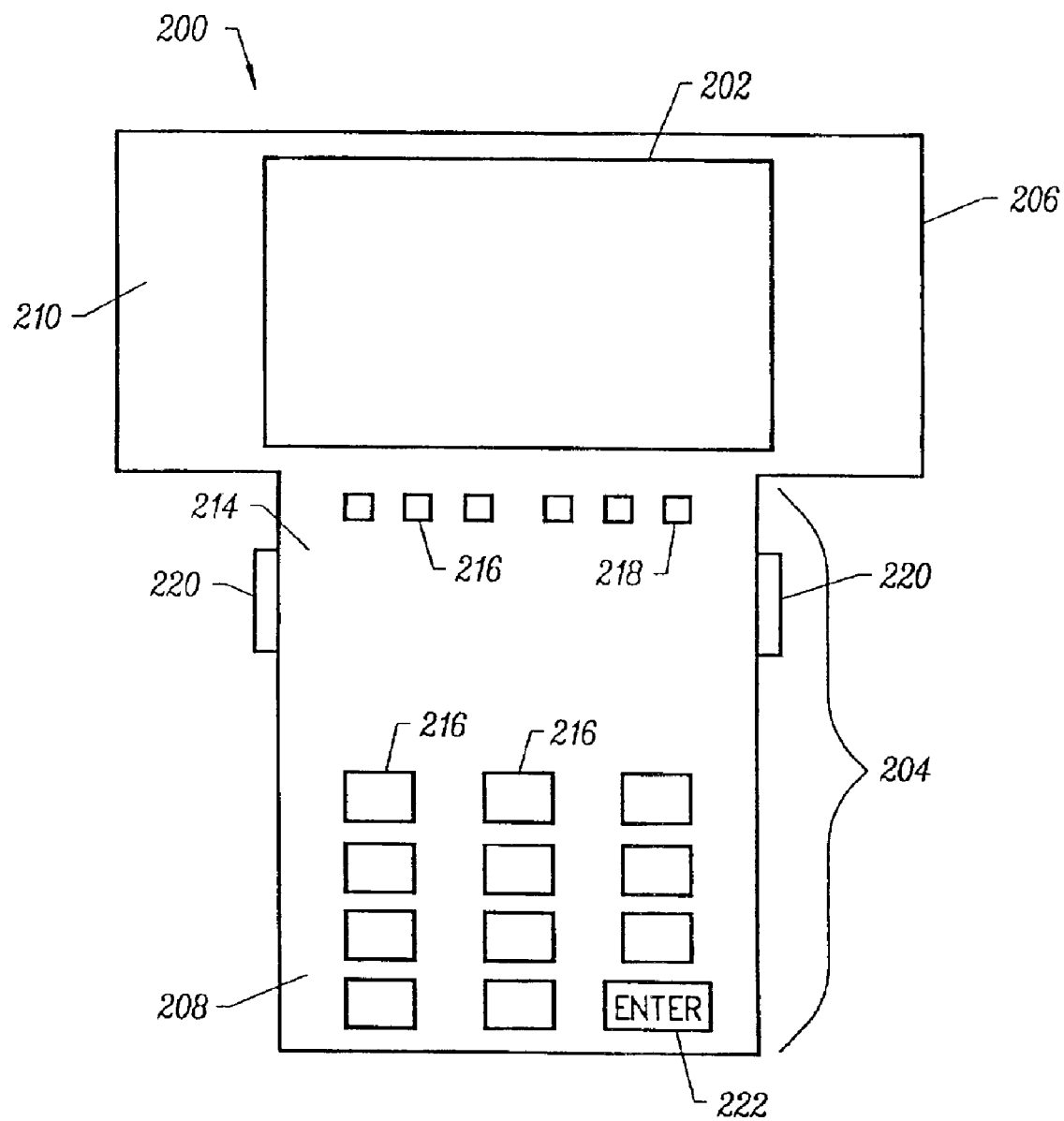
FIG. 2A shows a simplified front view of an exemplary mobile data terminal according to an embodiment the present invention.

FIG. 2A illustrates an exemplary front view diagram of an MDT 200 according to an embodiment of the present invention. This diagram is merely an illustration and should not limit the scope of the claims herein. One of ordinary skill in the art would recognize other variations, alternatives, and modifications. Data from the GPS and MIC may be illustrated on a display 202 of the MDT. The display permits the user to visually inspect the displayed data and act accordingly. The display can be any suitable output device such as a liquid crystal display or an active matrix liquid crystal display, as well as other types of displays, e.g., laser, diodes. The display should have a sufficient region for providing information (e.g., text, numbers) in an easy to read manner to a user. Additionally, the display can work under limited or low power conditions in some embodiments. The display also can be used as an input device such as a touch sensitive screen used in, for example, a product called PalmPilot™ made by 3Com™ Corporation of California. Preferably, the display is also resistant to extreme environmental temperature ranges (e.g., freezing) and is shock resistant. Furthermore, the display is sealed or isolated from moisture and particulates such as "dust" or contamination. These and other features will become more apparent throughout the present specification and more particularly below. Additionally, although the above display is configured in the MDT, the invention also has other applications. For example, the display can be detached from the MDT. The display can be loosely coupled to the MDT. Alternatively, the display can be integrated into another device such as a watch, a helmet, glasses, clipboard, and the like.

In an embodiment, information from the MIC such as changes in delivery or pick-up schedules, lunch break approvals, emergencies, traffic conditions, vehicle location, and personal messages may be displayed. Also, if the MDT is a pager, the user can receive business, personal, and other messages such as reminders, phone numbers, and emergencies. In an embodiment, the received data may include general information that may be broadcast to many users simultaneously, such as sports scores or other news. The display can also be coupled to another output device such as a beeper, a pager, electric shocker, or a vibrator to alert the user in a specific or selected situation such as an emergency.

In an embodiment, the MDT may also receive data from the user. In such an embodiment, the MDT may have a data entry portion 204. As shown in FIG. 2A, the data entry area may be a keypad. Other types of data entry tools may be utilized including a flat-panel keypad, a recorder that receives and stores sounds such as speech, a voice recognition unit which could recognize speech and convert the speech into data indicative of the speech such as text data, a touch-sensitive display, a display area allowing the user to write or draw characters or symbols such as a signature (e.g., pen computing), a bar-code reader, or a scanner (e.g., an optical character recognition device). If the data entry area is one of the last two examples, the data entry portion may coincide with the display 202. Alternatively, if the data entry portion receives data through writing or drawing on a display, the MDT or MCU may include circuitry to recognize hand-writings or signatures. This ability, for example, could assist the user in determining whether the person signing for a package has the authority to do so.

As shown in FIG. 2A, the MDT may include a housing 206 adapted to fit in the user's hand, for example. Such a hand-held design permits the user to hold the MDT with one hand and enter data with the other hand. Alternatively, if the data entry portion receives audio input, the user may conveniently hold the MDT with one hand, enter data, and still have one hand free. Such an arrangement also permits a user with physical handicap to use the MDT more conveniently. The housing is preferably made of a suitable material to withstand environmental variations such as temperature and weather. Accordingly, it is desirable to have a housing that is resistant to moisture and particulate contamination. This feature can be achieved by way of seals such as o-type rings and rubber gaskets, which seal one member of the housing with another member of the housing.

Furthermore, the housing can be sufficiently rigid to withstand mechanical shock, although other embodiments may require a flexible or "soft" housing for ergonomic purposes. In these embodiments, the housing can have a coating made of a soft or flexible synthetic material, which tends to be easier to handle with "hot" and "sweaty" palms, for example. Preferably, the housing is also made of an isolating or shielding material which can electrically isolate the internal electronics from external transmission lines that can lead to "noise" or multi-path influences. The housing is also chemically resistant and inert to isolate the internal components from chemical influences. Although some desirable features have been described, numerous other features can be implemented into the present housing design.

Additionally, the MDT is detachable from the MCU in some embodiments. A detachable design allows the user to use the MDT away from the MCU. Thus, the user may not need to carry the whole MCU in order to use the system. Furthermore, an internal MDT power supply 208 would permit the user to use the MDT away from the MCU. The MDT power supply may also be mounted externally, for example, on a belt clip. Such a configuration may provide a lighter MDT which may be carried by hand for a longer period to distance. The MDT is generally less than 5 pounds, less than 2.5 pounds, or less than 1 pound to merely ounces in preferred embodiments.

If detachable, the MDT can be able to transfer data to, and receive data from, the MCU when connected to the MCU. In this embodiment, the user enters data while away from the MCU and later connects the MDT to the MCU. Once connected, the MDT and MCU can transfer data to each other. This configuration obviates driving or even having an antenna, and associated circuitry, in the MDT for receiving and transferring data while detached from the MCU.

Alternatively, the MDT may receive, transmit, or transmit and receive data while detached from the MCU. In such an embodiment, the MDT may have an MDT antenna 210 and associated circuitry, which is shown in reference to FIG. 2B. The MDT antenna may be internal, as shown, or external. The MDT can transfer data back and forth with the MCU, MDS, and MIC via the MDT antenna. To reduce the circuitry needed and/or power consumed, the MDT may be restricted to receiving data only (such as if the MDT is a pager), or transmitting data only. Depending upon the frequency chosen for remote data transfer between the MDT and MCU, the MCU may require an additional MCU/MDT antenna 138.

Given the various embodiments described above, the MDT may take several forms. In an embodiment, the MDT can be encased in a portable data terminal (PDT) 3100 made by Symbol Technologies, Inc. Alternatively, the MDT may be encased in an electronic personal organizer such as the PalmPilot™. The MDT may also include, or simply be, a printer.

Figure 2B:
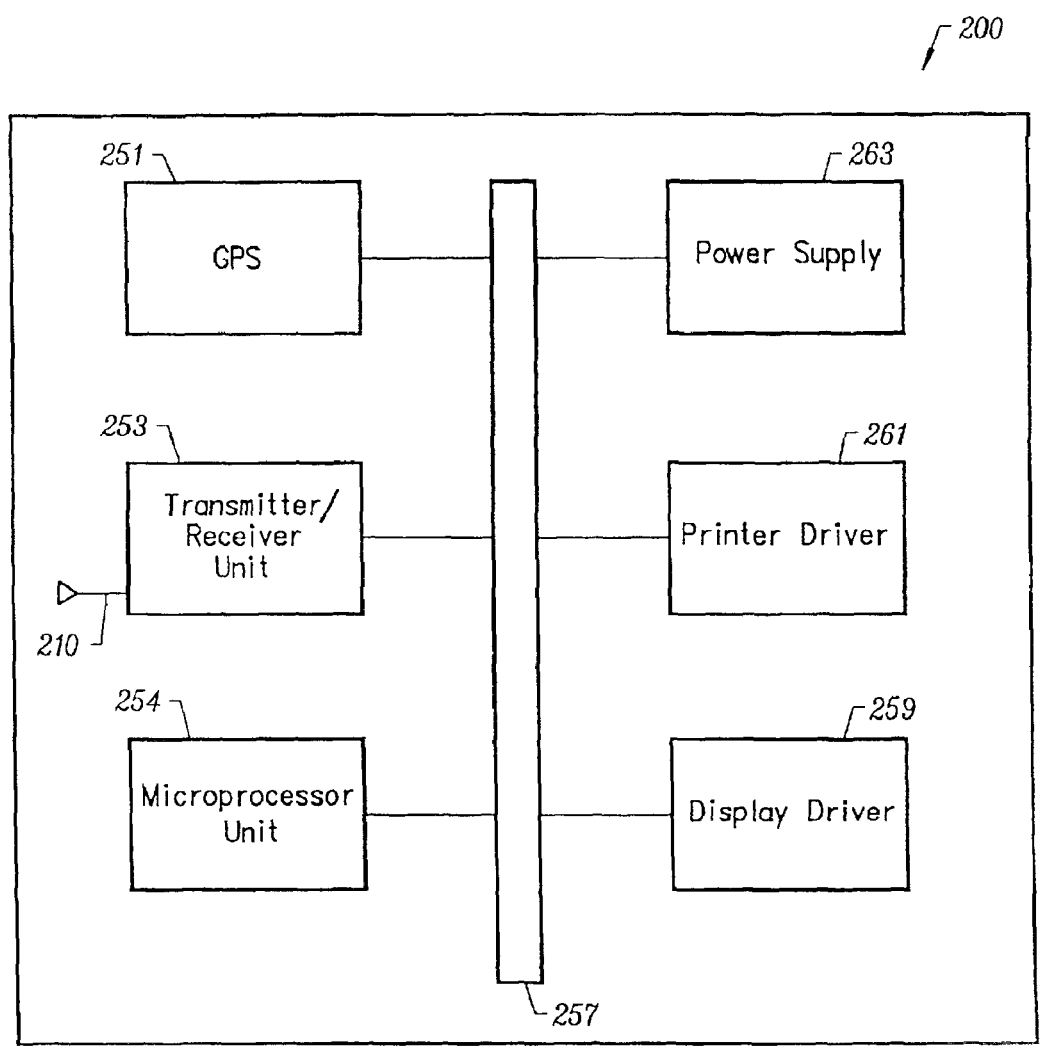
FIG. 2B is a simplified block diagram of an apparatus according to an embodiment of the present invention.

FIG. 2B is a simplified block diagram of the MDT shown above. The simplified diagram includes, among other elements, a GPS 251, a transmitter/receiver unit 253, a microprocessor unit 254, a power supply 263, a printer driver 261, a display driver 259, which are coupled to each other by way of a common bus(es) 257. The GPS determines positioning information, which can be displayed by way of the display through the display driver or which can be sent to the MIC through the transmitter/receiver unit. Additional output of information can be directed to an optional printer by way of the printer driver. The power supply provides energy in the form of electrical voltage and current to elements of the MDT. Preferably, the power supply is a rechargeable battery such as "NiCad" or the like. Alternatively, low voltage applications can be driven by a solar power supply unit, which can also be used to recharge the battery in some embodiments. Antenna 210 is coupled to the transmitter/receiver. In an embodiment, the antenna is capable of communicating through radio frequency radio signals. The location and type of the antenna, however, is merely exemplary and one of ordinary skill in the art would recognize other variations, alternatives, and modifications. For example the antenna may be internal or external to the device, or may utilize other types of signals to communicate, such as infra red. Overall functionality of the MDT is often overseen using the microprocessor based unit in the present embodiment.

Figure 3:
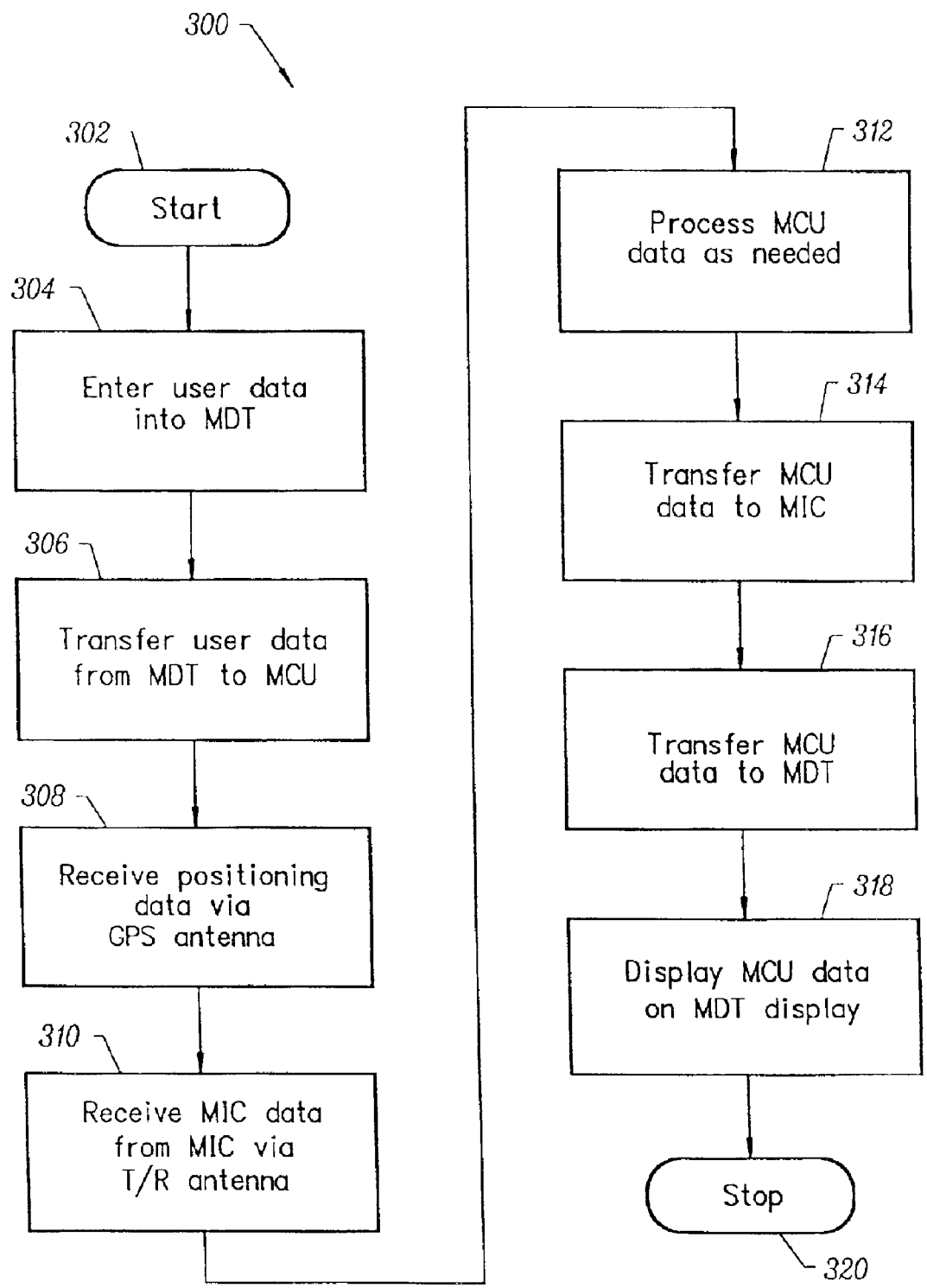
FIG. 3 is a simplified flow diagram of a method according to an embodiment of the present invention.

FIG. 3 shows an example of a simplified method 300 according to an embodiment of the present invention using a system such as that shown in FIGS. 1 and 2. This method is exemplary only and does not limit the claims to this embodiment. The order in which the steps appear in the figure are largely arbitrary and may appear in many orders different from the specific order shown in FIG. 3.

The method starts at step 302 and proceeds to step 304, when user data is entered into the MDT. This data entry may take any of numerous forms depending on the particular MDT used. For example, the user may enter data by pressing keys on a keypad, touching portions of a touch screen, scanning a document, or reading a bar code.

At step 306, the user data is transferred from the MDT to the MCU. Again, this data transfer may take any of numerous forms. For example, the data transfer may be accomplished via the MDT antenna, or by coupling the MDT and MCU using a cable, or by positioning the MDT into a cradle in the MCU having MCU contacts adapted to couple to corresponding MDT contacts.

At steps 308 and 310, the MDS receives positioning data via the GPS antenna and MIC data via the T/R antenna. As described above, the positioning data could also come from local position detectors or other positioning systems. The GPS and T/R antennas may be specifically designed or selected to reduce the power needed to provide adequate data transfer between the MCU and the positioning system or the MIC.

In step 312, the MCU processes MCU data (including, for example, the user data, positioning data, and MIC data) as needed. Such processing may include manipulating the user data, positioning data, and MIC data and converting them into formats compatible with the MIC or the MDT. For example, the positioning data may require manipulation in order to display this information on the MDT. Also, this step may include the processing needed to determine information such as vehicle speed and heading.

In step 314, the MCU data is transferred to the MIC. All, selected part, or none of the information available for transfer may be transferred. This data transfer may typically involve sending the data via the T/R antenna to a corresponding antenna at the MIC.

In step 316, the MCU transfers data to the MDT. All, selected part, or none of the information available for transfer may be transferred. This data transfer may occur in the same manner as described above with respect to transferring data from the MDT to the MCU. The MCU may be configured to transfer data when a communication link between the MCU and the MDT exists, or periodically. For example, the MCU may accumulate data for transfer to the MDT for a predetermined time period, then transfer some part of the accumulated data at the end of the time period. Alternatively, the MCU may transfer data to the MDT in real-time, as soon as data is ready for transfer.

In step 318, the MCU data is displayed on the MDT display. The displayed data may include the MCU data transferred from the MCU, the user data entered into the MDT, and/or predetermined data not entered by the user or received from the MCU. An example of the predetermined data would be prompts provided to the user to request data input, text or symbols displayed near the user data, or MCU data that may provide an indication of the significance, or meaning, of the displayed user or MCU data.

Finally, the process terminates at step 320. While the above method has been described using a specific order, many combinations and permutations of the order presented are possible. The steps may appear in almost any order within a few logical guidelines. These guidelines may merely ask that data exists before an attempt to transfer or process it. For example, step 306 of transferring user data from the MDT to the MCU may follow step 304 at a later time. Likewise, step 312 of processing MCU data may follow any combination of the steps that provide data to the MCU, such as steps 306 through 310. Similarly, steps 314 and 316 of transferring MCU data to the MIC and the MDT may follow any combination of the steps that provide data to the MCU. And, step 318 of displaying MCU data on the MDT display may follow the step of transferring MCU data to the MDT at a later time.

Additions and omissions to the steps of FIG. 3 is also acceptable. For example, the MCU need not receive MIC data from the MIC. As a further example, the MCU may not even have GPS (or other positioning system) capabilities and, hence, the method need not include receiving positioning data. Other deletions are also possible. Moreover, the method may include more steps or sub-steps including transferring data to a RAM network that may provide coverage nationwide, globally, and beyond.

Software Description

In an embodiment, the present invention includes software to control the user interface and data processing operations. The software may partly or completely reside in the MCU or MIC, but preferably resides in the MDT. Thus, while the software is sometimes referred to below as the MDT software, this label refers to an, but not the only, possible embodiment of the present invention. In some embodiments, the MDT may be encased in a Symbol terminal, such as Series 3100, that has its own software. The software described below may be an addition, a modification, or a replacement of software supplied with the Symbol terminal. The software of the present invention may control receipt, processing, and transmission of data between the MCU, MDT, MIC, user, etc.

Moreover, the software described below, in accordance with an embodiment of the present invention, may support several configurations of the MCU. Moreover, one configuration does not necessarily include more or less hardware than another configuration. For example, an external modem configuration may support a Symbol Series 3100 terminal, an external RAM-compatible Mobitek Modem (sometimes referred to as a Mobidem), and a Motorola 505sd modem. This configuration may, for example, not support GPS functionality.

Similarly, a black box configuration may support a Symbol Series 3100 terminal and a black box including a RAM-compatible Mobitek Modem module, and a Trimble OEM GPS receiver card. This configuration, for example, could support, among others, modem communications and GPS information receipt, processing, and transmission.

The software preferably runs on the MDT, interfaces with the external Mobitek modem or a black box including the GPS and the MCU T/R. Also, the MDT software preferably includes a traffic manager and a report scheduler.

Preferably, the MDT software is organized in a modular fashion. This arrangement may provide compartmentalized functionality to assist with creation and modification of the software code and debugging of problems. For example, an engine module may communicate with the GPS. This module could prepare data for transmission to the GPS and process data received from the GPS. The data transmitted and received may or may not pass through or be stored in the microprocessor unit. In some embodiments, the engine module supports Magnavox 4200 and engine receivers used in the GPS.

In an embodiment, a hardware initialization module may provide initialization and hardware interface functions for the MDS. In this respect, the MDT may initialize the entire MDS by transmitting initialization parameters to the MCU to initialize the MCU T/R, the GPS, and the microprocessor unit. After initialization, this module can provide interface functions among the various MDS components. In a preferred embodiment, this module may also provide support for an event timer facility of the MDS. The event timer facility could, for example, allow users to have a number of timers based on the Symbol terminal system timer.

In another embodiment, an MDT module may provide MDT-specific functions. For example, the MDT module may support data entry forms (e.g., a package delivery form or a hospital admittance form) that are larger than the physical size of the screen by allowing scrolling of the forms. In addition, a number of routines could support automatic list building by selecting and inserting an identification number in appropriate form field. The MDT module may provide a recall of information that is the same from job to job, such as customer-related information, by having the user provide the identification number. This would save the user time and effort in entering such information. For example, the customer's address, phone number, billing, and special instruction information may be recalled based upon entry of the customer's name or other identification tools such as the identification number.

Other features may include using a Menus module to support scrolling menus, time and distance position reporting, data compression, and blinking overlaid indicators for canceled, re-transmitted, and changed jobs. The user may select items in each menu by scrolling or entering an associated number. To exit from any menu, the user may press a clear key, etc. Some examples of the menu operations and options are discussed in more detail below.

In a preferred embodiment, an MDT utility module may provide utilities for an MDT interface. The MDT interface may include a display screen upon which data may be displayed prompting the user for information or providing the user with information. To assist the user with the MDT interface, the MDT utility module may provide processes for, among other things, creating menus, positioning a cursor in the menus, and checking for input from the user.

FIG. 4 shows a sample startup activation screen. This screen displays general information and, for example, prompts the user to press the acknowledge key to activate the system. In an embodiment, a timer requires the user to press the enter key within a predetermined time (e.g., five seconds) or the MDT would shut down, requiring reactivation by the user before use. Alternatively, the startup screen may ask for the user to enter a security code. This will, for example, only provide authorized personnel access to the MDT. Other methods of startup activation may include finger-print recognition, retina recognition, etc.

FIG. 5 shows a sample warning screen displayed by the MDT at least for safety purposes. This or other warning screens may be displayed for different purposes. For example, the screen may display contact information in case the MDT is lost by the rightful owner.

FIG. 6 shows a welcome screen that the MDT may display. Information regarding matters including company name, version of the software, copyright, patent, trademark, or other intellectual property protection may be displayed on this screen. This screen may also display contact information in case the MDT is lost by the rightful owner.

Figure 7:
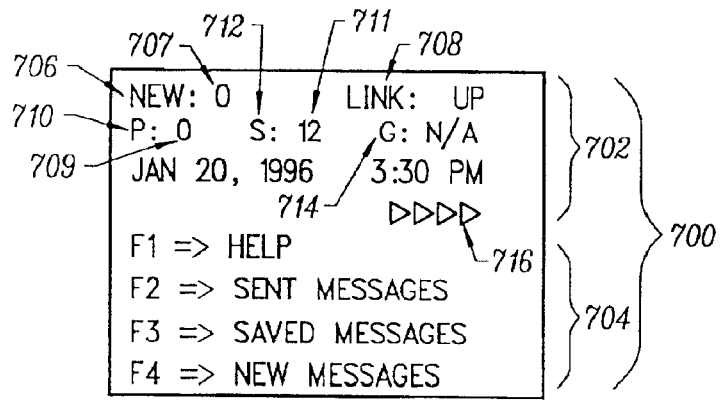
FIG. 7 shows a simplified sample mobile data terminal display primary menu according to an embodiment of the present invention.

FIG. 7 shows an primary menu 700 of the MDT with an upper portion 702 including status indicators, and the current date and time, and a lower portion 704 providing information about user selectable functions and the corresponding keys. The MDT status indicators shown in FIG. 7 provide information about the current operating status of the MDT. A NEW indicator 706 flashes when new messages are received. An indicator 707 displays the number of new messages. A LINK indicator 708 informs the user as to whether the network link is UP or DOWN. In an embodiment, the MDS communicates with the MIC only if the link is UP. A BATT indicator (not shown) may replace the LINK indicator when the MDT is disconnected from the MCU. The BATT indicator may provide general energy status of a battery in the MDT by, for example, indicating that the battery is either GOOD, LOW, or DEAD. Any of the MDT indicators may flash to indicate an abnormal status. A number 709 next to a pending indicator 710 displays the number of messages currently awaiting transmission. A number 711 next to a saved indicator 712 displays how many messages have been saved. A GPS indicator 714 provides information as to the age of GPS data and current GPS navigation capabilities. An "UNK" status may designate an unknown GPS status. Similarly, "N/A" may indicate that GPS information is unavailable or "OLD" may indicate that the most recent GPS data is older than 10 seconds. "NV2" may indicate that only 2-D navigation is available (i.e., only 3 satellites are visible) while "NV3" may indicate that 3-D navigation is available (i.e., more than 4 satellites are visible).

A signal-strength indicator 716 may indicate the signal strength of the modem. The signal-strength indicator may display up to six bars (e.g., right-facing arrowheads in FIG. 7). Three or more bars may indicate very strong communication signal, providing a very good coverage area.

The lower portion of the primary menu displays several options available to the user by pressing various keys. For example, pressing the F1 key may display a help description. Pressing the PREV or NEXT keys may then step through various help pages. To return to the primary menu, the user can press the MENU key.

Pressing F2 from the primary menu may allow the user to view sent messages. In an embodiment, the MDT retains the four most recently sent messages. Pressing F2 from the primary menu may cause the MDT to display a list of sent messages with corresponding current statuses such as delivered or pending and the time each was sent. Using the PREV/up-arrow and NEXT/down-arrow keys may step through these messages. An extended beep sounds may warn the user when no further scrolling is possible.

In an embodiment, to view saved messages the user may press F3 from the menu 700. The MDT then displays the latest saved message which could be scrollable as discussed above. Moreover, the user may delete sent and saved messages by navigating through the appropriate screens. Before deleting any messages, the MDT may confirm the deletion action.

Pressing F4 from the menu 700 may provide access to new messages. For example, if the NEW indicator in the primary menu is blinking, the MDT may have one or more new messages. Pressing F4 may cause the MDT to display the new messages, for example, with the newest message displayed first. Once the user reaches the new messages, the user may scroll through the various new messages.

Figure 8A:
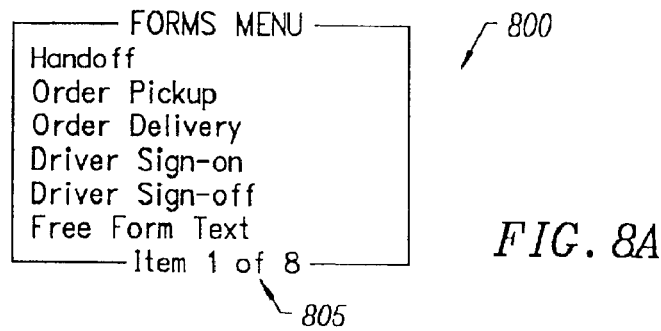
FIGS. 8A and 8B illustrate exemplary forms menus for the mobile data terminal display according to an embodiment of the present invention.
Figure 8B:
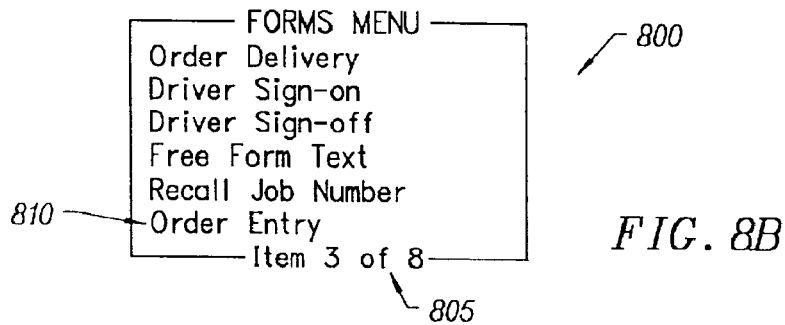

FIGS. 8A and 8B illustrate a simplified FORMS MENU 800. As shown, various options may be displayed on the FORMS MENU. This menu may also be scrollable to ensure all related information are displayed in the same menu. For example, FIGS. 8A and 8B may be 2 of may available screens within the same menu 800. An area 805 may show an order of the present screen amongst the available screens within the same menu 800. The user may select a desired form by either highlighting the form's title using an up-arrow or a down-arrow key and pressing an enter key. Alternatively, numbers associated with each item may be entered.

Preferably, each form displayed in the FORMS MENU may be designed to ensure the user spends less time in preparing reoccurring information. For example, form 810 may enable the user to enter orders by utilizing previously saved information in order to minimize data entry time and possible errors. Once a form is filled, the user may send the currently-selected form to, for example, the MIC.

Figure 9A:
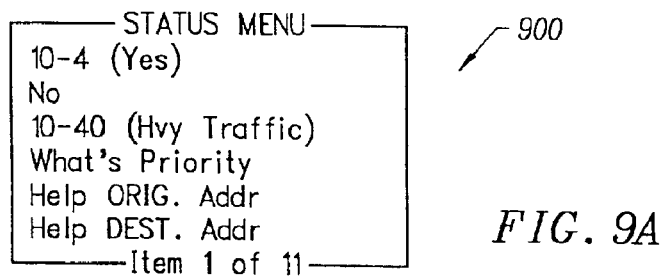
FIGS. 9A and 9B show exemplary status menus for the mobile data terminal display according to an aspect of the present invention.
Figure 9B:
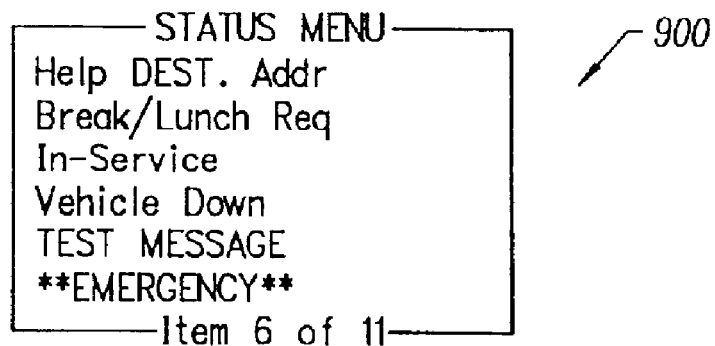

FIGS. 9A and 9B illustrates an exemplary STATUS MENU 900. Again, the user may select a desired form by using the up-arrow and down-arrow keys and the enter key, or by entering the appropriate code. The selected status screen is then displayed. If a different status is desired, the user may repeat the process, or may use the PREV and NEXT keys to cycle through the various status codes. Once the desired status is displayed, the user may send the status to, for example, the MIC. The user may also exit the status menu.

In an embodiment, the MDT keypad performs several generic operations according to the keys pressed. Table 1 lists some generic operations according to key stroke or combination of strokes that initiate corresponding functions.

TABLE 1

| KEY | Function Performed |
|---|---|
| FORM | Displays the FORMS menu. |
| STATUS | Displays the STATUS menu. |
| F1 | Executes function associated with F1 menu selection. |
| F2 | Executes function associated with F2 menu selection. |
| F3 | Executes function associated with F3 menu selection. |
| F4 | Executes function associated with F4 menu selection. |
| MENU | Displays Primary menu. |
| SAVE | Saves currently displayed form to the "SAVED MESSAGES" list. |
| ACK | Sends an acknowledge message to the host when appropriate, and also may save the message. |
| NEXT | Performs the next logical operation in the current context. |
| PREV | Performs the previous logical operation in the current context. |
| ENTER | Moves the cursor to the next editable field in form editing mode. May also select a highlighted option. |
| CTL + SEND | Sends currently displayed FORM or STATUS. |
| DEL | Deletes a message. |
| CLR | Clears a field. In some menus, this key is used to go back to the previous or a primary screen. |
| CLR followed by CLR | Clears, when in edit mode, editable data from the form (by pressing CLR twice). |
| FNC | Selects the blue colored functions. |
| BSP | Deletes the character before to the cursor (e.g., BACKSPACE). |
| SPACE | Inserts a space character. |
| "FNC followed by BSP" | |
| LAMP | Toggles the back-light ON and OFF. |
| DARK and LIGHT | Cycles through the brightness level of the back-light. |
| UP ARROW (↑) | Selects next scrollable value for this field, scrolls up the displayed form, or produces error beep if at the top of the form. |
| DOWN ARROW (↓) | Selects previous scrollable value for this field, scrolls down the displayed form, or produces error beep if at the bottom of the form. |
| LEFT ARROW (←) | Moves to the previous character in an editable field of a FORM. |
| RIGHT ARROW (→) | Advances to the next character in an editable field of a FORM. |
| ALPHA KEYS | Input an alpha character. |
| NUMERIC KEYS | Input a numeric character. |
| SPECIAL CHARACTERS | The GREEN characters are special characters that can be inserted in any editable field. |
| FNC followed by SHF | Toggles the CAPS LOCK mode. |

Figure 10:
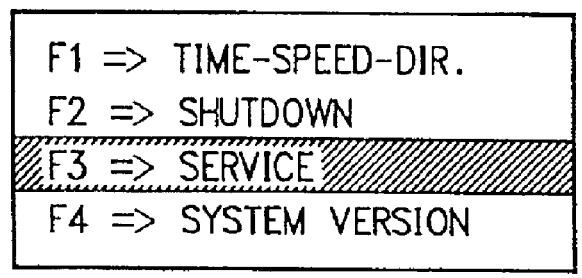
FIG. 10 shows a simplified sample secondary menu for the mobile data terminal according to an embodiment of the present invention.

FIG. 10 shows a secondary menu of the MDT indicating various options for the user. In an embodiment, pressing a next key from the primary menu causes the MDT to display this screen. In the embodiment of FIG. 10, once at the secondary menu, the user may press any key (except F1–F4) to go back to the primary menu.

Moreover, pressing F1 from the secondary menu may provide the user with time, speed, and direction information. This may be accomplished by displaying GPS information, if available. A time-speed-direction screen may show the current time, the speed of the vehicle, and the direction it is heading such as north, east, etc. It also may display how long the system has been turned on. In this embodiment, pressing any key returns the user to the secondary menu.

To turn OFF the MDT the user can select the F2 key from the secondary menu. If connected to the MCU, shutting down the MDT may also shut down the MCU after the MCU sends a message to the MIC (which could take as long as five minutes or more if communication coverage is poor). It may take a few seconds to a minute before the MDT actually powers down.

Figure 11:
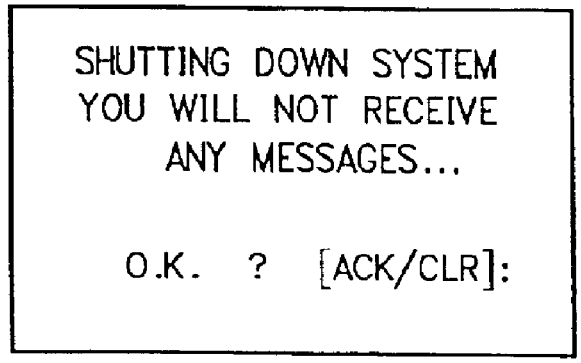
FIG. 11 illustrates a simplified sample shutdown screen for the mobile data terminal according to an embodiment of the present invention.

FIG. 11 is an exemplary illustration of a shutdown screen according to an embodiment of the present invention. This screen may inform the user that the user will not receive messages while the MDT is shut down and prompts the user to proceed with shut down (ACK) or cancel the shut down request (CLR). Once the system has been shut down, the user may unplug the appropriate cables and remove the system from the vehicle for safe storage. The MDT may retain all data in the memory.

Returning to FIG. 10, pressing the F3 key may permit the user to enter a field-service screen. Access to this screen, however, may require a password and, preferably, only field service personnel have access to valid passwords or security codes.

In the embodiment of FIG. 10, the user may also view the MDT system application version number by pressing F4. From the system version screen, pressing any key may return the user to the secondary menu.

The MDS may be configured to save the last 40 job ID's (tag or identification numbers) to make it easier to enter them into an outgoing form rather than re-entering them using the alpha/numeric keys or other means such as a voice recognition, character recognition, etc. When the cursor is placed in the job ID field, the user may press the up-arrow or down-arrow keys to scroll through the list of the latest JOB IDs. Once the desired job ID is displayed in this field, the user can proceed to the next field using the ENTER key. Some IDs may be displayed in reverse order indicating that a "pickup form" was sent to the host.

Jobs in the MDT may be canceled by the dispatcher, retransmitted, or changed. In each of these instances, the MDT may display these conditions in a unique way. If a job is canceled, the MDT displays the job to be canceled with a big flashing "X" overlaying the job. The MDT automatically removes the job once the user acknowledges the message. If the job is retransmitted as is, the MDT displays the job with a big flashing "R." Finally, if the job is retransmitted with some changes in it, the MDT may detect that the job has changed and display the job with a big flashing "C." The MDT may display these screens from either the primary or secondary menus. The retransmitted and changed jobs may replace the previous copies of the job. At any given time, the MDT may have only one copy of a job.

The MDT may also display various error messages to assist the user. Examples of error messages may include: invalid form number; invalid status; invalid queued message; could not translate incoming message; error saving data . . . press any key to continue; error retrieving data . . . press any key to continue; error setting default lat/long; RCV queue full . . . incoming message was lost . . . please delete SAVED/SENT messages or process NEW messages; out of memory . . . incoming message was lost . . . please delete SAVED/SENT messages or process NEW messages; out of memory . . . message was not sent . . . please delete SAVED/SENT messages or process NEW messages; delete a message from the save queue before saving this message; etc.

Furthermore, the MDT may display various warning messages to assist the user. Examples of warning messages may include: Communications Out-Of-Range . . . Press ACK to continue; GPS not available; Mobidem information not available; Running low on memory . . . Please delete SAVED/SENT messages or Process NEW messages; Terminal cable out . . . Connect cable and press ACK to send shutdown message; etc.

In an embodiment, the MDT may be restarted by a warm boot. For example, if the MDT application appears to be frozen (e.g., text on the display does not change even after trying to go to a different menu) for any reason and nothing revives it, then the user may want to warm boot the MDT. To warm boot the MDT, the user may press the PWR key for about 30 seconds to shut off the MDT. Then the user may press the 4 and 5 keys simultaneously followed by pressing the PWR key twice. turn off in 15 seconds of no activity.

Trouble Shooting Guide

Table 2 indicates various possible trouble conditions and possible solutions to recover from them according to an embodiment of the present invention.

TABLE 2

| PROBLEM | CAUSE | SOLUTION |
| --- | --- | --- |
| 1. MDT does not turn ON when disconnected from MCU | Battery may be weak. | Charge the battery by plugging in the MDT cable. If problem still persists, then replace the battery. |
|  | Screen may have blanked out. | Hit any key to view data. |
| 2. PEND count increases. | Bad radio antenna or loose cable, LINK: DOWN | Re-position the radio antenna and tighten all cable connections. |
|  | Out of coverage area or a dead spot area, LINK: DOWN | Move vehicle into an area of good coverage. |
|  | "BATT" displayed in the Primary screen. | Disconnect and reconnect the MDT cable so that BATT changes to "LINK: UP". |

TABLE 2-continued

| PROBLEM | CAUSE | SOLUTION |
| --- | --- | --- |
| 3. Cannot SAVE any more messages | Memory buffers are full. | Delete messages from the various lists, such as SENT, SAVED or NEW message lists. |
| 4. MDT application is frozen | Unknown system error. | Try WARM BOOT first or else have a Field Service Personnel perform a COLD BOOT by resetting the unit. |
| 5. LINK says "DOWN" on the Primary screen | See item 2. | See item 2. |
| 6. "BATT: LOW" or "BATT: DEAD" displayed on the Primary screen | The MDT is disconnected from the MCU and the internal battery is weak. | Plug the MDT into the MCU so that the internal battery gets charged. |
| 7. MDT keeps even after NEW messages have been read | NEW messages have not been ACKNOWLEDGED | Use F4 to VIEW the new messages and acknowledge them by pressing the ACK (ENTER) key. |
| 8. LCD Display screen on the MDT is UNREADABLE | MDT may have been exposed to direct sunlight for an extended period of time. | Move the MDT away from the sun. It may take several minutes to restore the display to normal. DO NOT EXPOSE the MDT to direct sun-light (The effect of sun-light on the face side is considerably worse than on the other side, so it is a good precaution to leave the MDT face-side down when it is on a car seat.) |
| 9. Date and time displayed is incorrect | The host (MIC) configuration for setting the clock may be incorrect or the MDT may not be communicating with the host. | Report problem to Mobile Information Systems, Inc. |

Although the above description has been described in terms of hardware and software, the present invention is not limited to the specific hardware and software described. For example, the functionality described herein can be further combined in terms of hardware or further combined in terms of software. The hardware can also be separated or combined with other software. The software can also be separated from the hardware. Furthermore, the functionality can all be stored in the form of electronic data on an integrated circuit, for example. The integrated circuit can include, among others, DRAM, SRAM, FRAM, and Flash Memory Cells, as well as other integrated circuit devices in the form of "chips" or "cards." Accordingly, the present specification should not be construed as limiting the scope of the language of the claims herein.

Additionally, although an embodiment of the present invention is fully described above, implementation specific details and data structures are described in the attached Detailed Design and Functional Specification in Appendix A. Various modifications, alternate constructions, and equivalents will be obvious to those with skill in the art. Thus, the scope of the present invention is limited solely by the appended claims and their full scope of equivalents.

What is claimed is:

1. A mobile data processing system comprising:
   an interface unit, including a processor and a positioning system coupled to a first antenna and to the processor; and
   a remote data terminal, electrically coupled to the interface unit during at least a first time period, capable of data transfers with the interface unit during the first time period and with a user,
   wherein the positioning system is capable of determining the location of the interface unit.

2. The system of claim 1 wherein the processor is coupled to a second antenna and the remote data terminal includes a third antenna, and wherein the remote data terminal and the interface unit are capable of data transfer during the first time period using the second and third antennas.

3. The system of claim 1 wherein the interface unit and the remote data terminal are adapted to physically couple during the first time period.

4. The system of claim 1 further comprising a system power supply wherein the processing system is capable of operation independent of an external power supply.

5. The system of claim 1 wherein the interface unit is adapted to removably couple to an external power supply.

6. The system of claim 1 wherein the interface unit is electrically coupled to an external power supply of a vehicle.

7. The system of claims 1 wherein the remote data terminal includes a data terminal power supply.

8. The system of claims 1 wherein the remote data terminal includes a keypad.

9. The system of claims 2 wherein the first and second antennas are coupled to the interface unit with first and second cables and coupled to first and second magnetic bases respectively such that the first and second antennas may he removably mounted on a metallic surface.

10. A mobile data processing system comprising:
    an interface unit, including a processor and a positioning system coupled to a first antenna and to the processor; and
    a remote data terminal, electrically coupled to the interface unit during at least a first time period, capable of data transfers with the interface unit during the first time period and with a user,
    wherein the positioning system is a global positioning system.

11. The system of claim 1 wherein the remote data terminal is adapted to be hand-held.

12. A method of processing data comprising steps of:
    receiving user data from a user interface of a control unit;
    receiving positioning data from a positioning system of the control unit; and
    transmitting the user data and positioning data, using a second antenna of the control unit, to a base station.

13. The method of claim 12 wherein the step of receiving user data comprises:
    entering the user data into a remote data entry terminal; and
    transferring the user data to the control unit.

14. The method of claim 13 wherein the entering step comprises actuating keys on a keypad.

15. The method of claim 13 wherein the entering step comprises scanning a bar code.

16. The method of claim 13 wherein the entering step comprises scanning data.

17. The method of claim 12 wherein the transmitting step comprises transmitting data to a RAM network.

18. A method of processing data comprising steps of:
    removably coupling a remote data terminal to a control unit that includes an antenna;
    receiving positioning data in the control unit from the antenna;
    transferring at least a portion of the received positioning data to the remote data terminal; and
    displaying data indicative of at least a portion of the positioning data on a display of the remote data terminal.

19. A data processing system comprising:
    a housing;
    a user interface secured to the housing and adapted to receive user data from a user;
    a positioning system including a first antenna;
    a transmitter/receiver including a second antenna; and
    a processor, coupled to the user interface, the positioning system, and
    the transmitter/receiver, capable of processing positioning data from the positioning system received by the first antenna, t/r data from the transmitter/receiver received by the second antenna, and the user data and further capable of transferring the processed data to the transmitter/receiver for transmission outside the system.

20. The system of claim 19 wherein the user interface is a plug adapted to receive a cable.

21. The system of claim 19 wherein the user interface is a cradle having electrical contacts.

22. The system of claim 19 wherein the user interface is a keypad.

23. A computer program product for use with a base station, a positioning system and a user interface, the computer program product comprising:
    a computer-readable memory comprising:
        code that processes user data entered into the user interface;
        code that processes positioning data from the positioning system; and
        code that directs transmission of the processed user data and processed positioning data to the base station.

24. The computer program product of claim 23 further comprising code that directs the user interface to prompt the user to enter the user data.

25. The computer program product of claim 23 further comprising code that directs the user interface to display the positioning data on a display screen of the user interface.

26. The computer program product of claim 23 wherein the code that processes the positioning data calculates a speed of the positioning system.

27. The computer program product of claim 23 wherein the code that processes the positioning data calculates a heading of the positioning system.

28. A mobile data terminal unit comprising:
- a processor for processing user data;
- a display for displaying output data;
- a power source for operating the mobile data terminal unit;
- a mobile control unit removably coupled to the mobile data terminal unit and configured to transmit data between the mobile control unit and a base unit; and
- a computer-readable memory including:
    - code that processes the input data;
    - code that processes the output data; and
    - code that directs transmission of the user data to a destination selected from a group consisting of the mobile control unit, the base unit and a mobile data suite, wherein the mobile data terminal unit is adapted to be hand-held.

* * * * *